United States Patent [19]

Meisner

[11] Patent Number: 5,572,716
[45] Date of Patent: Nov. 5, 1996

[54] METHOD AND APPARATUS FOR DETERMINING TIME-RELATED OPERATING PARAMETERS FOR COMPUTERS

[76] Inventor: Michael G. Meisner, 1197 Fairfield, Santa Clara, Calif. 95050

[21] Appl. No.: 217,955

[22] Filed: Mar. 25, 1994

[51] Int. Cl.$^6$ ............................................. G06F 1/08
[52] U.S. Cl. ................................................. 395/555
[58] Field of Search ................................... 395/550

[56] References Cited

U.S. PATENT DOCUMENTS 5,459,855  10/1995  Lelm ............................ 395/550

Primary Examiner—Thomas M. Heckler

Attorney, Agent, or Firm—Skjerven, Morrill, MacPherson, Franklin & Friel; Edward C. Kwok

[57] ABSTRACT

A basic input output system for a general-purpose computer provides a method for determining the oscillator frequency and setting system timing parameters by selecting a reference device and measuring the time necessary for performing a set number of operations of the reference device. Methods are disclosed for computer systems having fixed wait-state bus cycles and for systems having programmable wait-state bus cycles. The invention has particular applicability to Systems having CPU microprocessors that allow external selection of microprocessor-to-input oscillator frequency ratio. In such systems identification of the CPU microprocessor and its operating frequency is not enough information to set timing parameters for optimum performance. A BIOS and a general-purpose computer are provided in combination with the methods of the invention.

30 Claims, 3 Drawing Sheets

METHOD AND APPARATUS FOR DETERMINING TIME-RELATED OPERATING PARAMETERS FOR COMPUTERS

FIELD OF THE INVENTION

This invention relates generally to computers, and specifically to methods for determining operating frequencies of computer elements on startup an reset, and setting operating parameters accordingly.

BACKGROUND OF THE INVENTION

A typical desktop computer architecture, especially that of IBM/Intel compatible machines, includes a central microprocessor (µP) that communicates with random access memory and a system controller chip through a local bus. An expansion bus typically couples the system controller to peripheral devices, such as video control boards, network adapters, modems, and the like. For one class of IBM/Intel architecture, the expansion bus is known as the AT bus. The components described above are typically mounted on a system board or main circuit board, often termed the motherboard in the art.

The motherboard typically includes an oscillator (OSC) that supplies a high frequency clock signal to the microprocessor and other components connected on the local bus. More recent oscillators are speed programmable. Most microprocessors, such as the Intel486DX, are simply operated at the OSC frequency, e.g., if the OSC frequency is 33.33 MHz, then the microprocessor operates at 33.33 MHz. To drive the expansion bus at the industry-standard AT bus frequency of 8.33 MHz, the system controller divides the OSC frequency into a range of selectable ratios, such as OSC/4 (4:1), OSC/5 (5:1), OSC/6 (6:1), etc. For example, an OSC/4 Ratio for an input OSC frequency of 33.33 Mhz produces a bus frequency of 8.33 MHz.

A Basic Input Output System (BIOS) chip typically connected to the AT bus includes firmware for determining various timing parameters for the motherboard, such as AT bus wait states and the like.

Some recently introduced microprocessors, such as the Intel486 DX2™, include circuitry that causes them to operate at a frequency twice the oscillator frequency. If, for example, the OSC frequency is 33.33 MHz, then a DX2 microprocessor will operate at 66.66 MHz, i.e., at an OSC-To-µP Ratio or 1:2. The result is greatly improved computing performance without increasing the cost of the motherboard and its components other than the microprocessor. Other components may still run at a 33.33 MHz.

Current practice is to provide user- or dealer-configurable motherboards with a selectable set of timing parameters in the BIOS, so that a board can be configured for different types of microprocessors and oscillator speeds.

The clock ratios for DX and DX2 microprocessors are fixed at 1:1 and 1:2, respectively. Because these microprocessors have known OSC-To-µP frequency ratios, their OSC frequency car, be relatively easily deduced. For example, a self-configuring BIOS, sold under the trademark MR BIOS by Microid Research Inc. of Santa Clara, Calif., contains firmware for automatically determining the OSC frequency by identifying the type of microprocessor installed, calculating the microprocessor's internal frequency, and dividing that frequency by a logically selected Ratio. After the OSC frequency is determined, the self-configuring BIOS automatically configures various system timing parameters, including the OSC-to-bus ratio for the AT bus.

A new type of microprocessor, of which the Intel486 DX4™ is an example, does not have a single fixed OSC-To-µP clock ratio, but instead offers a range of selectable integer and fractional ratios. e.g., 1:2, 1:2.5, 1:3. This new type of microprocessor also has no provision for allowing external firmware, such as the system BIOS, to identify which clock ratio is selected. For this type of microprocessor is hereinafter termed an IANS microprocessor, for Identification Alone is Nto Sufficient. For this type microprocessor, identification alone is simply not sufficient for determining the OSC-To-µP clock Ratio, hence the Osc frequency, to have the needed information to set system timing parameters. If a microprocessor of this type is installed on a motherboard with a conventional user-configurable BIOS, the user will need to know the OSC-To-µP Ratio in order to set the correct parameters.

Even the self-configuring BIOS described above will not be able to set the proper parameters for an IANS microprocessor, because the self-configuring BIOS works on the assumption that the microprocessor-to-OSC clock ratio is Fixed. Therefore, proper knowledge of the IANS microprocessor's clock ratio and its configuration parameters is paramount for a person, whether a trained technician or an end user, assembling or setting up the computer. If such knowledge is not on hand, then the wrong parameters may be set, and the computer will not operate correctly.

What is clearly needed is a method for automatically determining the OSC frequency for a motherboard, even when identification of the microprocessor is not sufficient, so modular computer systems can be assembled and modified without the need for technical information or personnel.

SUMMARY OF THE INVENTION

According to a preferred embodiment of the invention, a method is provided for determining input oscillator frequency for a computer having a CPU microprocessor and a communication bus with a bus cycle composed of X bus CLKs, comprising steps of (a) selecting a frequency ratio R between the input oscillator and the bus, (b) selecting a microprocessor-independent reference device connected to the bus, (c) measuring elapsed time for a pre-programmed number of operations of the reference device using a timing reference independent of the input oscillator, each operation requiring one bus cycle of X bus CLKs, (d) calculating the period for a single bus CLK by dividing the elapsed time by the pre-programmed number of operations and by X, (e) calculating the operating frequency of the bus by taking the inverse of the period for a single bus CLK, and (f) determining the frequency of the input oscillator by multiplying the operating frequency of the bus by R. In an alternative embodiment, a microprocessor-dependent reference device may be used in the method, and the microprocessor overhead may be removed prior to determining the bus cycle period and the bus frequency.

In another aspect of the invention, very useful for systems with programmable wait states, a method is provided wherein a reference device is tested by timing over a set number of operations with different wait states, and resulting equations are combined to eliminate time values resulting from dependence of the reference device on the CPU microprocessor.

The BIOS capability provided according to various embodiments of the present invention makes it possible to set timing parameters at an optimum performance level each time a system is started or reset, even if the system architecture is revised between startups. For recent CPU microprocessors having externally selectable frequency ratios with the input oscillator, the present invention is the only way, other than manual configuration, to set timing parameters for optimum performance. This capability is critical for recent architectural developments, such as expanded modularity that allows and promotes frequent changes of functional components including the CPU microprocessor.

In other aspects of the invention, a BIOS comprising a ROM device and resident control routines configured for performing the methods of the invention are provided, and a general-purpose computer is provided with such a BIOS.

BRIEF DESCRIPTION OF THE DRAWING FIGURES

DESCRIPTION OF THE PREFERRED EMBODIMENTS

Figure 1:
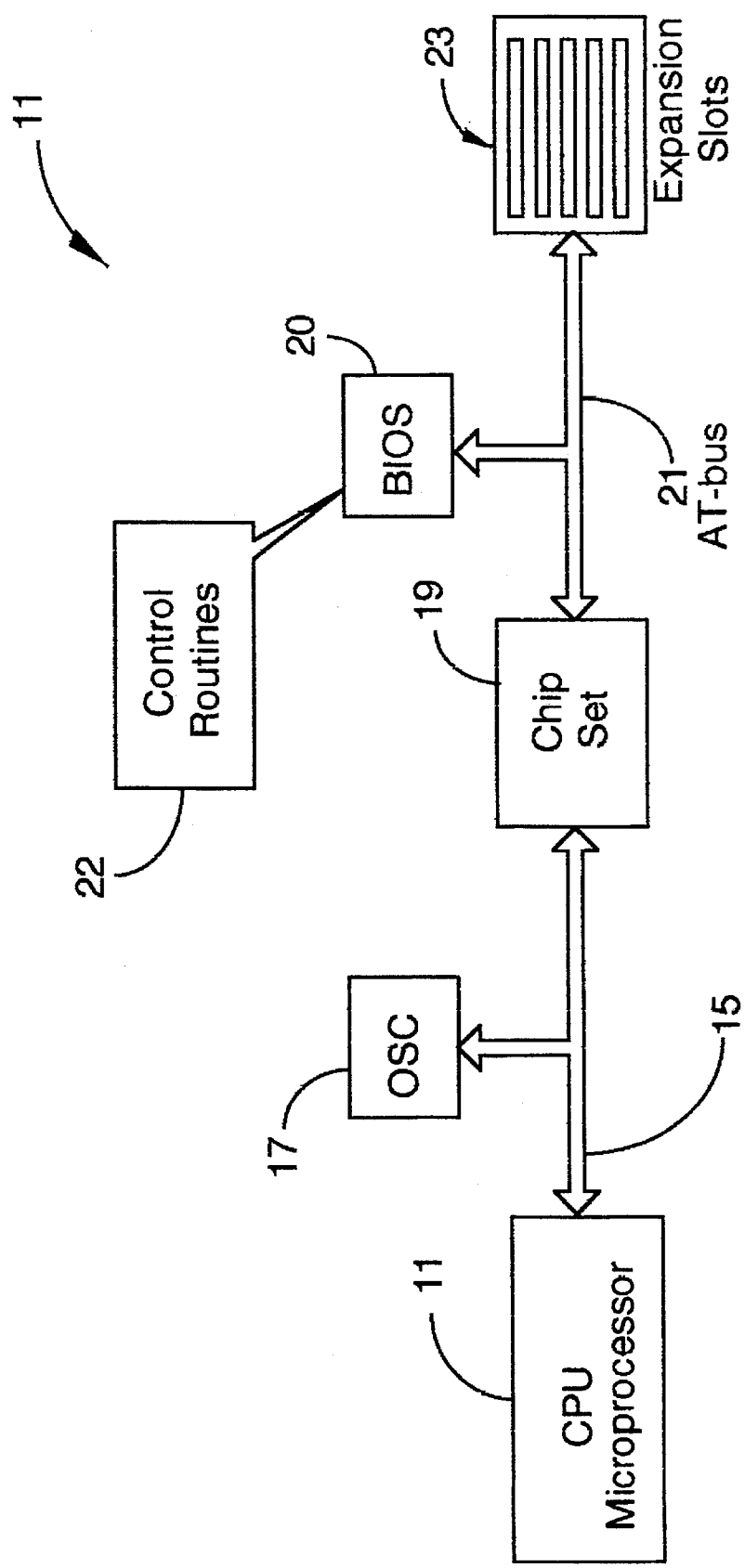
FIG. 1 is a block diagram of some essential elements of a computer system with a BIOS according to an embodiment of the present invention.

FIG. 1 is a block diagram of some functional elements of a general-purpose computer 11 comprising a CPU microprocessor 11 connected to an OSC 17 and a bus control chip set 19 through a local bus 15. Chip set 19 communicates on an expansion bus 21, in this case an industry standard AT bus, with expansion slots 23 and a system BIOS 20. BIOS 20 comprises resident control routines 22 according to an embodiment of the present invention, capable of determining the OSC frequency, even when the CPU microprocessor may operate under a variety of µP-to-OSC Frequency ratios that may not be discerned by identifying the CPU microprocessor.

In accordance with a preferred embodiment of the present invention, a method for determining the oscillator frequency, $f_{OSC}$, and then setting parameters for operation of a computer using the oscillator, includes measuring the operating period of a reference device (REF), connected on a bus that has a known OSC-To-bus frequency ratio, R. The operating frequency, $f_{REF}$, of the reference device is the operating frequency of the bus multiplied by the number of wait states for a bus cycle. In this case, the product of $f_{BUS}$ and the ratio R is $f_{OSC}$.

Formula 1: $f_{OSC} = f_{BUS} \times R$

E.g., if $f_{BUS}$ is 8.33 MHz, and the Ratio is 4/1, then $f_{OSC} = 8.33 \times 4 = 33.32$ MHz.

In the conventional situation, using a non-IANS microprocessor, such as an Intel486 DX or DX2, which run at the known Ratios of 1:1 and 1:2. respectively with the OSC, it is only necessary to identify the microprocessor to know $f_{OSC}$. The non-IANS microprocessors are easily identified, and the internal frequency may be measured by methods well known in the art. As an example, if the microprocessor is a DX2, and is running at 66.66 MHz, then $f_{OSC}$ is 33.33 MHz (66.66×½). Similarly, if the microprocessor is found to be a DX, and to be running at 33.33 MHz, then $f_{OSC}$ is also 33.33 MHz.

If the microprocessor is an IANS microprocessor, capable of being strapped to several frequency ratios relative to the input OSC, then a reference device other than the microprocessor must be used. A suitable component is one whose frequency source is the OSC, so that it runs at the same frequency as, or at a known, fixed frequency ratio to the OSC. Such a device should normally generate, or can be instructed to generate, regular events over a predetermined elapsed time. The reference device in one aspect of the invention also should operate independent of microprocessor control during the timing period, i.e., it should be microprocessor independent. $f_{REF}$ can then be calculated by counting the number of events that occur in the elapsed time, then dividing the number by the elapsed time. $f_{BUS}$ is then determined by the number of wait states per cycle. $f_{OSC}$ is then calculated, knowing the ratio R, by Formula 1 above.

A Direct Memory Access (DMA) controller is one example of a microprocessor-independent reference device. DMA controllers can be configured to transfer data directly and repeatedly between one memory address and another without microprocessor intervention. Each memory transfer by the DMA controller in a computer architecture requires a known number or clock cycles (CLK). The number of CLKs required for a memory transfer cycle depends on the particular type of system in which the DMA controller is installed. By knowing this number, and repeating the transfer operation over a pre-programmed elapsed time, measured with a separate timer, such as the Real-Time-Clock (RTC) standard in all personal computers, $f_{REF}$ and $f_{BUS}$ may be discovered.

Formula 2 immediately below illustrates the process disclosed and described immediately above.

Formula 2: $f_{REF}$=Total operations/Elapsed Time or $f_{BUS}$=(N CLKs Per operation (cycle)×Total cycles)/ Elapsed Time As an example, if memory reads and writes each require 5 CLKs, and 3,200,000 memory transfer cycles are counted over a period of 2 seconds, then $f_{BUS}$=(5 CLKs per cycle× 3,200,000 cycles)/2 seconds=8,000,000 Hz or 8.0 MHz. A DMA controller typically operates at $f_{OSC}/4$, that is R=4:1, so using this $f_{BUS}$ in Formula 1 yields an $f_{OSC}$ of 32.0 MHz.

Microprocessor-dependent devices may also be used in determining $f_{OSC}$. A microprocessor-dependent reference device in an IANS microprocessor system is a device which has a known $f_{OSC}$ to $f_{BUS}$ ratio R, and whose frequency source is the OSC, but which depends upon microprocessor control for its operation. As an example, such a device may perform a 5 bus CLK operation, and for each operation, a 4 µP CLK microprocessor instruction cycle (microprocessor overhead) is required for control. It is important to realize that the duration of a bus CLK is not the same as the duration of a µP CLK. The µP typically runs must faster than the bus.

Because of its microprocessor dependency, any measurement or timing of such a reference device will also include microprocessor overhead. For such a reference device, $f_{BUS}$ can be found by causing the device to repeat an operation a predetermined number N of times and measuring the elapsed time. The elapsed time will consist of the period of the bus multiplied by N and by the number of bus CLKs per bus cycle, plus the microprocessor overhead.

For a microprocessor-dependent reference device, Formula 3 below illustrates the process described immediately above.

Formula 3:

Formula 3:

$$f_{BUS} = \frac{(N \text{ Opn's} * \text{bus } CLKs/\text{Operation}) - (N \text{ Operations} * \mu P \text{ } CLKs/\text{OP'n})}{\text{Elapsed Time}}$$

Again, use of Formula 1 then determines $f_{OSC}$.

Alternatively, instead of measuring the elapsed time for performing a predetermined number of operations, a predetermined elapsed time can be set, and the total number of operations performed in the preset time may be measured.

A motherboard typically comprises many suitable microprocessor-dependent devices. These include AT bus devices that run at the nominal AT bus frequency $f_{BUS}$ of 8.33 MHz, such as the system BIOS.

Figure 2:
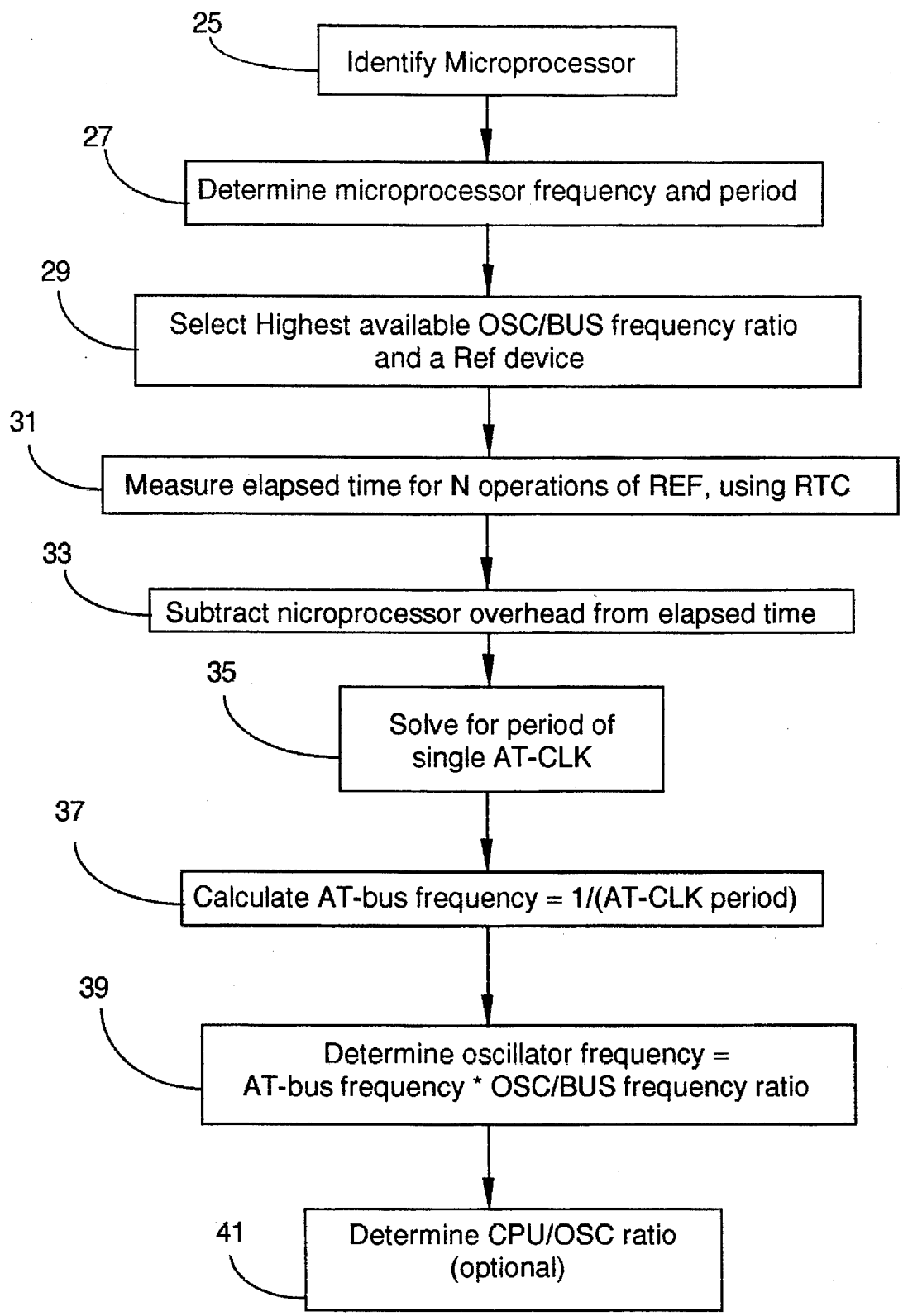
FIG. 2 is a logic flow diagram illustrating a method according to one aspect of the invention.

FIG. 2 is a step diagram for an embodiment of the present invention applied to an exemplary IBM/Intel-compatible system comprising an IANS microprocessor running at 83.33 MHz, a BIOS, a RTC, and a system controller that produces industry-standard 5 CLK (wait states) AT cycles and also provides a selection of OSC-To-bus frequency Ratios. The BIOS itself is selected as the reference device.

At step 25 the microprocessor is identified. At step 27 the microprocessor is tested to determine the operating frequency $f_{\mu P}$ and the duration of one microprocessor CLK ($1/f_{\mu P}$). E.g., 83.33 MHz and 12 ns. in the present example.

At step 29 the highest available OSC-to-bus frequency ratio is selected for this procedure to ensure the selected bus speed does not exceed the AT bus specification. In this case 4:1, so the bus frequency is $f_{OSC}/4$.

At step 31 an operation of the reference device (the BIOS in this example), is repeated N times, N being a preprogrammed number, and the elapsed time for the N operations is measured by reference to the RTC. For example, with N=1,000,000, the instruction REP LODSB (Repeat Load String Byte) may be repeated 1,000,000 times. This causes a repeated read of a byte of data from the BIOS.

Depending on the microprocessor type, the number of microprocessor CLKs required to request the data is known (4 for a 486 family microprocessor). Also, the BIOS requires 5 AT bus CLKs to supply the data. The total elapsed time, then, includes the number of operations N times the bus CLK cycles per operation, and the time the microprocessor takes to request the data. This is the microprocessor overhead.

At step 33 the microprocessor overhead time is subtracted from the total elapsed time. The result is the reference device operating time. As an example, if N is 1,000,000, 4 microprocessor CLKs are required for each instruction, and the microprocessor CLK period is 12 ns, the microprocessor overhead is 0.048 seconds. If, for example, the total elapsed time is 0.648 seconds, then the reference device operating time is 0.6 seconds.

At step 35 the period for a single AT-CLK is calculated. Since the reference device operating time of 0.6 seconds is equal to N×5×AT-CLK period:

AT-CLK period: 0.6 seconds/(5×N)
N=1,000,000
AT-CLK period: 0.6 seconds/5×10⁶=120 ns.

At step 37 $f_{BUS}$ is determined by taking the inverse of the AT-CLK period. In the example, $f_{BUS}=1/(1:2\times10^{-9})=8.33$ MHz.

At step 39 $f_{OSC}$ is determined by multiplying $f_{BUS}$ by the ratio selected in step 29, in this example 4. So $f_{OSC}=4\times8.33$ MHz=33.33 MHz.

At optional step 41 the strapping ratio between the OSC and the microprocessor may be determined by dividing the operating frequency of the microprocessor by $f_{OSC}$. In the example, the strapping ratio is 83.33/33.33=2.5. This step is optional because the strapping ratio isn't really needed for setting up the timing parameters for the motherboard, which can be done once $f_{OSC}$ is determined.

In practice, the total elapsed time measured in step 31 may include additional components, such as AT refresh time and RTC access time. These components can be subtracted from total elapsed time along with microprocessor overhead at step 33.

Figure 3:
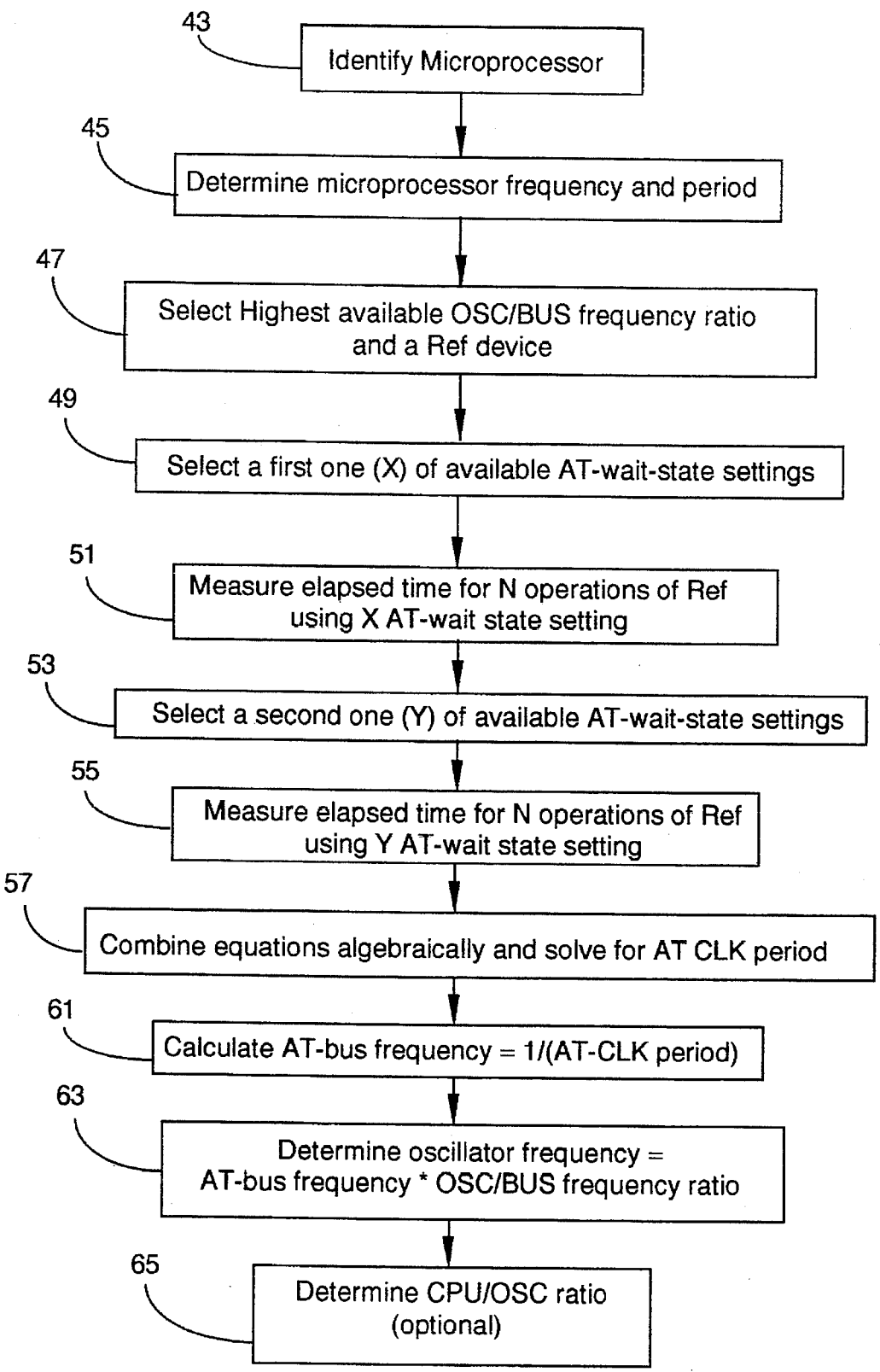
FIG. 3 is a logic flow diagram illustrating a method according to an alternative embodiment of the invention.

If the system controller supports programmable AT wait states (different numbers of CLKs per AT bus cycle), an alternative process may be used as shown in FIG. 3.

At step 43 the microprocessor is identified and at step 45 $f_{\mu P}$ is determined. At step 47 the highest OSC/bus frequency ratio is selected. These steps are the same as in the method described above with reference to FIG. 2.

At step 49 one of the AT wait-state settings is selected through the BIOS. For example, 5 CLKs per AT cycle may be selected, At step 51, the elapsed time for N operations is measured using the RTC.

At step 53 another AT wait-state setting is selected. For example, 4 CLKs per AT cycle. At step 55, elapsed time is measured again for N operations of the selected reference device, using the RTC and the second At wait-state setting. There are now two elapsed times, one using the first selected AT wait-state setting, and the other using the second selected At wait-state setting.

At step 57, the difference in the two elapsed times is determined in terms of the duration of an AT CLK, and the resulting equation is solved for the AT CLK period. That is, one equation is subtracted from the other, and the algebraic difference is set equal to the difference in elapsed time. The result of the algebraic difference is $et_1=et_2=N\times(AT\ CLK\ duration)\times(X-Y)$. In taking the algebraic difference, the microprocessor overhead, as well as other overhead, such as refresh time, cancels.

Once the AT CLK duration is determined, $f_{BUS}$ is determined at step 61 as the reciprocal of the AT CLK period, then $f_{OSC}$ is determined at step 63 by multiplying $f_{BUS}$ by the ratio of OSC/bus frequency selected in step 47. With the determination of $f_{OSC}$, the timing constants for operation of the motherboard may be determined and set.

Small errors introduced by timing inaccuracies and device synchronization issues can be eliminated if the IANS microprocessor supports a discrete set of OSC-To-CPU frequency ratios, such as 1:1, 2:1, 2.5:1, 3:1, 3.5:1, 4:1, etc. If the ratio calculated in any of the foregoing methods does not precisely match any available ratio, then the closest ratio to the calculated ratio is highly probably the correct ratio. For example, if the calculated Ratio is 1:3.62. then the actual ratio is most probably 1:3.5. Now, working backward, $f_{OSC}$ may be determined precisely by dividing $f_{\mu P}$ by this ratio (the closest actual ratio to the calculated ratio).

Either or both of the methods above described for determining the oscillator frequency may be incorporated into the firmware of a BIOS as instructions. These instructions will automatically determine $f_{OSC}$ for an installed microprocessor on a motherboard, and optionally select the proper frequency for a system having a programmable OSC, particularly for an IANS microprocessor, on startup. Thereafter, the BIOS can automatically configure system timing parameters accordingly. The methods of the present invention ensure that a computer equipped with such a BIOS will be initialized correctly, without a need for an operator to know the IANS microprocessor's OSC-To-CPU frequency ratio and to manually program it into the BIOS.

It will be apparent to those with skill in the art that there are many variations that may be made in the embodiments described above, without departing from the spirit and scope of the invention. For example, there is a broad variety of reference devices that might be selected to accomplish the purposes of several steps in the methods of the invention. Instead of a DMA controller, another microprocessor-independent device can be used; instead of the BIOS, another microprocessor-dependent device, such as a video ROM can be used. If available, timing devices other than the RTC on the system board can be used, such as an 8254 multi-channel timer/counter. Also, instead of the examples given, other CPU-To-bus frequency ratios can be used, and other AT bus wait state settings can be used for the calculations.

What is claimed is:

1. A method for determining input oscillator frequency for a computer having a CPU microprocessor and a communication bus with a bus cycle composed of X bus CLKs, comprising the steps of:
   (a) identifying a frequency ratio R between the input oscillator and the bus;
   (b) selecting a microprocessor-independent reference device connected to the bus;
   (c) measuring elapsed time for a pre-programmed number of operations of the reference device using a timing reference independent of the input oscillator, each operation requiring X bus CLKs;
   (d) calculating the period for a single bus CLK by dividing the elapsed time by the pre-programmed number of operations and by X;
   (e) calculating the operating frequency of the bus by taking the inverse of the period for a single bus CLK; and
   (f) determining the frequency of the input oscillator by multiplying the operating frequency of the bus by R.

2. The method of claim 1 wherein R selected is the highest ratio available for selection.

3. The method of claim 1 wherein the bus is an industry-standard AT bus.

4. The method of claim 1 further comprising a step for setting timing parameters for the computer based on the input oscillator frequency.

5. The method of claim 1 wherein the reference device is a direct memory access controller.

6. The method of claim 1 wherein, at step (c) operations are counted for the reference device for a pre-programmed elapsed time rather than measuring elapsed time for a pre-programmed number of operations.

7. The method of claim 1 wherein the reference device is a microprocessor-dependent device, requiring interaction with the microprocessor for each operation of the reference device, and the method includes steps for determining the microprocessor period and computing and subtracting the microprocessor overhead from the elapsed time in determining the bus CLK period.

8. A method for determining input oscillator frequency for a computer having a CPU microprocessor, a communication bus, and programmable wait states, comprising the steps of:
   (a) selecting a frequency ratio R between the input oscillator and the bus to drive the bus;
   (b) selecting a reference device connected to the bus;
   (c) selecting a first one of the programmable wait states wherein one bus cycle=X bus CLKs;
   (d) measuring elapsed time $t_1$ for a pre-programmed number N operations of the reference device, yielding a first equation $t_1=N*X*$bus CLK period+overhead
   (e) selecting a second one of the programmable wait states wherein one bus cycle=Y bus CLKs;
   (f) measuring elapsed time $t_2$ for N operations of the reference device, yielding a second equation $t_2=N*Y*$bus CLK period+overhead;
   (g) subtracting algebraically the second equation from the first equation, yielding a third equation wherein bus CLK period=$(t_1-t_2)/$N(X-Y)]
   (h) solving the third equation for the bus CLK period;
   (i) determining the bus CLK frequency by taking the inverse of the bus CLK period; and
   (j) determining the frequency of the input oscillator by multiplying the bus CLK frequency by R.

9. The method of claim 8 wherein the communication bus is an industry standard AT bus.

10. The method of claim 8 wherein R selected is the highest ratio available for selection.

11. The method of claim 8 further comprising a step for setting timing parameters for the computer based on the input oscillator frequency.

12. A basic input output system (BIOS) for a computer system with a CPU microprocessor and a communication bus having a fixed number X of wait states per bus cycle, the BIOS comprising:
   a ROM device configured for connecting to the communication bus; and
   control routines resident in the ROM and configured for determining input oscillator frequency by selecting a microprocessor-independent reference device, selecting an oscillator-to-bus frequency ratio R for driving the bus, operating the reference device for a preprogrammed number N of operations while measuring the elapsed time, determining the bus frequency by dividing the elapsed time by N*X and taking the inverse of the result, and determining the input oscillator frequency by multiplying the bus frequency by R.

13. A BIOS as in claim 12 wherein the bus is an industry-standard AT bus.

14. A BIOS as in claim 12 wherein the BIOS is configured for setting timing parameters for the computer based on the input oscillator frequency determined.

15. A BIOS as in claim 12 wherein the reference device is a direct memory access controller.

16. A BIOS as in claim 12 wherein the reference device is a microprocessor-dependent device, requiring interaction with the microprocessor for each operation of the reference device, and the BIOS is further configured for determining the microprocessor period and for computing and subtracting the microprocessor overhead from the elapsed time in determining the oscillator frequency.

17. A basic input output system (BIOS}for a computer system with a CPU microprocessor and a communication bus having programmable wait states, the BIOS comprising:
   a ROM device configured for connecting to the communication bus; and
   control routines resident in the ROM and configured for determining input oscillator frequency by selecting a reference device, selecting an oscillator-to-bus frequency ratio R for driving the bus, selecting a first one of the programmable wait states for which each bus cycle comprises X bus CLKs, operating the reference device for a pre-programmed number N of operations while measuring elapsed time $t_1$, yielding $t_1=N*X*$bus CLK period+overhead, selecting a second one of the programmable wait states for which each bus cycle comprises Y bus CLKs, operating the reference device for N operations while measuring elapsed time $t_2$, yielding $t_2 = N*Y*$bus CLK period, subtracting equation $t_2$ from equation $t_1$, yielding bus CLK period=$(t_1-t_2)/[N(X-Y)]$, solving for bus CLK period, determining the bus frequency by taking the inverse of the bus CLK period, and determining the input oscillator frequency by multiplying the bus frequency by R.

18. A BIOS as in claim 17 wherein the bus is an industry-standard AT bus.

19. A BIOS as in claim 17 wherein the BIOS is configured for setting timing parameters for the computer based on the input oscillator frequency determined.

20. A BIOS as in claim 17 wherein the reference device is a direct memory access controller.

21. A general-purpose computer comprising:

a CPU microprocessor;

a communication bus; and a basic input output system (BIOS);

wherein the BIOS comprises a ROM device configured for determining input oscillator frequency by selecting a microprocessor-independent reference device, selecting an oscillator-to-bus frequency ratio R for driving the bus, operating the reference device for a preprogrammed number N of operations while measuring the elapsed time, determining the bus frequency by dividing the elapsed time by N*X and taking the inverse of the result, and determining the input oscillator frequency by multiplying the bus frequency by R.

22. A general-purpose computer as in claim 21 wherein the ratio R is the highest selectable ratio.

23. A general-purpose computer as in claim 21 wherein the bus is an industry-standard AT bus.

24. A general-purpose computer as in claim 21 wherein the BIOS is further configured for setting timing parameters for the computer based on the input oscillator frequency determined.

25. A general-purpose computer as in claim 21 wherein the reference device is a direct memory access controller.

26. A general-purpose computer as in claim 21 wherein the BIOS is further configured for setting timing parameters for the computer based on the calculated input oscillator frequency.

27. A general-purpose computer comprising:

a CPU microprocessor;

a communication bus; and a basic input output system (BIOS);

wherein the BIOS comprises a ROM device configured for determining input oscillator frequency by selecting a reference device, selecting an oscillator-to-bus frequency ratio R for driving the bus, selecting a first one of the programmable wait states for which each bus cycle comprises X bus CLKs, operating the reference device for a pre-programmed number of operations while measuring elapsed time $t_1$, yielding $t_1 = N*X*$bus CLK period+overhead, selecting a second one of the programmable wait states for which each bus cycle comprises Y bus CLKs, operating the reference device for N operations while measuring elapsed time $t_2$, yielding $t_2 = N*Y*$bus CLK period, subtracting equation $t_2$ from equation $t_1$, yielding bus CLK period: $(t_1-t_2)/[N(X-Y)]$, solving for bus CLK period, determining the bus frequency by taking the inverse of the bus CLK period, and determining the input oscillator frequency by multiplying the bus frequency by R.

28. A general-purpose computer as in claim 27 wherein the bus is an industry-standard AT bus.

29. A BIOS as in claim 27 wherein the BIOS is configured for setting timing parameters for the computer based on the input oscillator frequency determined.

30. A BIOS as in claim 27 wherein the reference device is a direct memory access controller.

* * * * *